United States Patent [19]

Osborne

[11] Patent Number: 4,687,407

[45] Date of Patent: Aug. 18, 1987

[54] THREE-POINT HITCH LOADER

[76] Inventor: Don Osborne, Rte. 1, Box 145, Kieffer, W. Va. 24950

[21] Appl. No.: 810,769

[22] Filed: Dec. 19, 1985

[51] Int. Cl.⁴ .............................................. B66C 3/02
[52] U.S. Cl. ................................... 414/703; 172/473; 298/19 R
[58] Field of Search .............. 414/697, 703, 708, 719, 414/742, 696; 172/480, 473; 298/10, 11, 17 T, 19 R, 22 R

[56] References Cited

U.S. PATENT DOCUMENTS

| | | | |
|---|---|---|---|
| 2,788,138 | 4/1957 | Stueland | 414/703 |
| 3,198,357 | 8/1965 | Shelby | 414/703 |
| 3,503,528 | 3/1970 | Martelee | 414/754 |
| 4,358,241 | 11/1982 | Anderson | 414/703 |

FOREIGN PATENT DOCUMENTS 784162  10/1957  United Kingdom ............... 414/703

Primary Examiner—Joseph E. Valenza
Assistant Examiner—Donald W. Underwood
Attorney, Agent, or Firm—Newton, Hopkins & Ormsby

[57] ABSTRACT

A loading device is releasably attachable to a conventional farm tractor or other vehicle, having a three-point hitch. The device includes a bar for providing a mechanical advantage during the initial lifting of a load from the ground. The device is adjustable to facilitate mounting upon various models of vehicles having a three-point hitch. The bucket is controlled by a non-pressurized piston and cylinder assembly.

19 Claims, 8 Drawing Figures

THREE-POINT HITCH LOADER

BACKGROUND OF THE INVENTION

1. Field of the Invention

This invention relates to a loading device and is more particularly concerned with a loading device which is releasably attachable to and is powered by a conventional farm tractor or similar vehicle.

2. Description of the Prior Art

Loading devices which are releasably attachable to a "three-point hitch" of a conventional farm tractor are generally known in the prior art, as is evidenced by the Fortier Pat. No. 3,362,554 of Jan. 9, 1968, as well as Canadian Patent No. 598,427, issued on May 24, 1960, also to Fortier. The Fortier Pat. No. 3,362,554, involves a loader comprised of an awkward arrangement of long chains, latches, springs, and brackets. Fortier affords little mechanical advantage during the initial lifting phase, as compared to the present invention, and the maximum height to which the bucket of Fortier can be extended is also necessarily limited by Fortier's construction. When the main arm of Fortier is released from its raised position, a potentially dangerous situation is created as the arm falls. This action can also stress the chains and brackets which support the main arm. Further, Fortier has no method for selectively controlling the movement of the bucket as it dumps. The Fortier patents represent the closest prior art which is known in relation to the invention disclosed herein.

SUMMARY OF THE INVENTION

Briefly described, the present invention is adapted to be releasably mounted onto a conventional farm tractor or other vehicle having a "three-point hitch" and includes a lifting member comprised of a lifting bar which supports a pair of upstanding standards spaced in parallel fashion. The lifting bar and standards mount a pair of adjusting frames on their rearward sides. The front side of the lifting bar mounts a forward lifting bar which is selectively supported against undesired rotational movement by a pair of chains. Each end of the lifting bar is pivotally mounted to lifting levers which are a part of and powered by a conventional farm tractor or other vehicle having a "three-point hitch." The free ends of these lifting levers constitute the lower two points of the "three-point hitch." The lifting member receives therethrough a boom which is vertically movable within the standards and adjustable toward and away from the tractor within the adjusting frames. The rearward end of the boom is pivotally mounted to the third point of the "three-point hitch," which point is positioned above and between the lower two points.

Securely mounted to the front end of the boom is a transverse cross bar, so that the cross bar and boom approximate a "T" shape. Attached to both ends of the cross bar are brackets which pivotally support a bucket, which is used to load and dump the work. The pivotal movement of the bucket is controlled by a non-pressurized piston and cylinder assembly used in combination with an accumulating tank or reservoir. The flow of hydraulic fluid between the cylinder and reservoir is controlled by a valve positioned in the connecting hydraulic line. The valve is manually controlled by the operator to selectively control the pivotal movement of the bucket.

Accordingly, it is an object of the present invention to provide a loading device which is releasably attachable to and powered by a vehicle having a three-point hitch;

Another object of the present invention is to provide a loading device, in which the lifting force is transferrable to different points along the loading device;

Another object of the present invention is to provide a loading device in which the bucket thereof can be raised to greater heights than prior art loading devices which are releasably attachable to vehicles having a three-point hitch;

Another object of the present invention is to provide a loading device in which the bucket thereof can be selectively controlled to pivot to any desired position along its path of rotational movement;

Another object of the present invention is to provide a loading device in which a mechanical advantange is accomplished when initially lifting a load from a position below the attachment points of the loading device to a vehicle;

Another object of the present invention is to provide a loading device which is inexpensive to manufacture, durable in structure and efficient in operation;

Another object of the present invention is to provide a loading device which is adaptable to be mounted to different models of vehicles which have a "three-point hitch";

Other objects, features and advantages will become apparent from the following description when taken in conjunction with the accompanying drawings wherein like characters of reference designate corresponding parts throughout the several views.

DETAILED DESCRIPTION OF THE INVENTION

Figure 1:
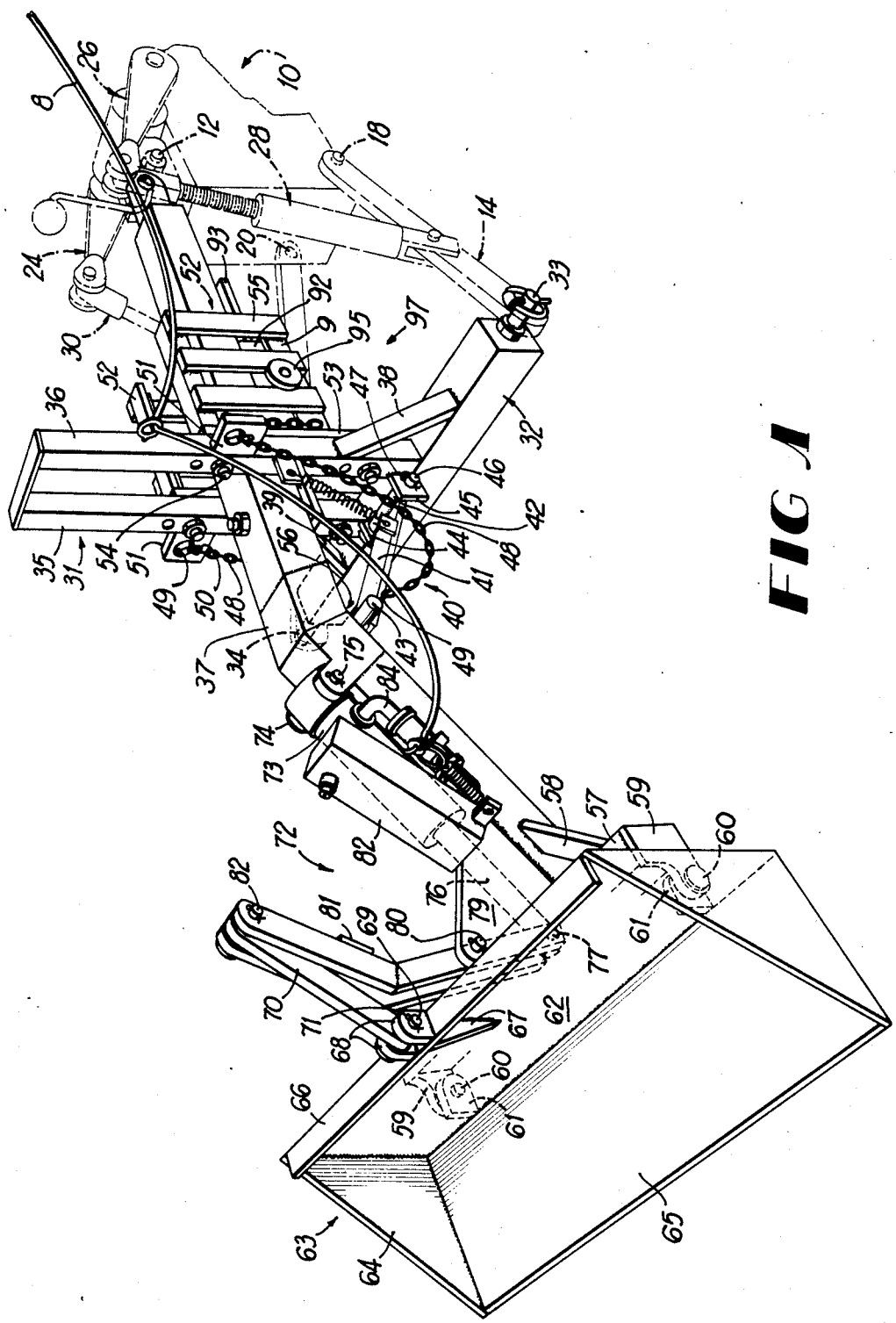
FIG. 1 is a perspective view of the present invention mounted to a vehicle having a three point hitch.

Referring now in detail to the embodiments chosen for the purpose of illustrating the present invention, numeral 10 in FIG. 1 depicts in fragmentary view and in phantom lines, the rear portion of a conventional farm tractor, which mounts a three-point hitch. This three-point hitch includes a top bracket 12 and lifting arms 14 and 16. Top bracket 12 serves as a stationary pivot point, while lifting arms 14 and 16 are pivoted at pins 18 and 20 on tractor housing 22. Arms 24 and 26 are powered by the tractor (not shown) for rotational movement by any conventional means such as hydraulic or mechanical means, as is generally well known in the prior art. Arms 24 and 26 thereby impart motion to links 28 and 30 which cause lifting arms 14 and 16 to pivot about pins 18 and 20. As stated, three-point hitches are well known in the prior art, and are accompanied with various means of powering said lifting arms. The specific type of three-point is not important for the utilization of the present invention, as long as the hitch utilizes a stationary pivot point, such as bracket 12 and lifting arms such as 14 and 16. For the purposes of description of the present invention, the "rear" end of the present invention shall be the end attached to the three-point hitch, while the "front" end shall be the end which includes the bucket.

Referring now in detail to the elements which comprise the present invention, lifting frame 31 includes lifting bar 32 which mounts pins 33 and 34 at opposite ends thereof. Securely mounted onto bar 32 are a pair of upstanding support standards 35 and 36. These standards can be constructed of square tubular steel and are welded onto the top of bar 32 in parallel, spaced relationship so that midpoint of bar 32 lies on equal distance from standards 35 and 36, which are spaced just to a degree sufficient to allow boom 37 to move vertically in an unobstructed path, as shown in FIG. 1.

Standards 35 and 36 are additionally supported by braces 38 and 39. Power bar 40 includes plate 41 welded at one end to hollow tube 42 and at its other end to solid bar 43. Power bar 40 is pivotally mounted to the front of lifting bar 32 by spaced brackets 44 and 45. Pin 46 passes through a hole (not shown) in bracket 44, through tube 42, through bracket 45, and is held in place by suitable means such as cotter key 47. Similarly, all pins described herein can be held in place by any suitable means, such as cotter keys or nuts, which are generally known in the art. The power bar 40 is journaled by brackets 44 and 45 and pivots about pin 46. Bar 40 is restricted against undesired counterclockwise movement by chains 48 which are attached at one end to the forward end of bar 40 by eyes 49. The other ends of chains 48 pass through slots 50 in brackets 51, welded to standards 35 and 36. As is also well known in the prior art, slots 50 include a lower, vertically elongated portion (not shown) and an upper round portion. Chains 48 pass through the upper portion of their respective brackets and are allowed to drop into the lower, slotted portion thereby restricting the chains and so bracing bar 40.

Attached to the rear portion of standards 35 and 36, are adjusting frames 52. These frames are welded to plates 53 which are releasably mounted to their respective standard by pins 54. As shown in FIG. 1, frames 52 consist of horizontal bars 9 and spaced, vertical bars 55. Since frames 52 are mounted on the rear side of standards 35 and 36, boom 37 also passes freely in a vertical path through frames 52. The function of adjusting frames 52 will become apparent from the description below.

Boom 37 makes a slight angle at 56 so that its forward portion bends downwardly, as shown in FIG. 1. At the forwardmost end of boom 37 is transversely welded, cross bar 57. This cross bar 57 is braced by angle supports 58 on either side of boom 37. Attached to both ends of crossbar 57 are brackets 59 which receive pins 60 through holes (not shown) in brackets 59. Pins 60 are then received through ears 61 which are welded onto the rear panel 62 of bucket 63. Therefore, bucket 63 pivots about pins 60. As shown in FIG. 1, bucket 63 includes rear panel 62, side panels 64 and front panel 65. However, bucket 63 can be of any suitable design which is generally known in the prior art. Along the top edge of back panel 62 is flange 66. This flange may be either an integral part of rear panel 62 or may be welded thereto. Triangular brace 67 is welded along one leg to the lower midportion of flange 66 and along another leg to back panel 62.

Mounted on the top of flange 66, in spaced relationship, is a pair of brackets 68. These brackets have holes (not shown) therethrough to receive pin 69. Brackets 68 are spaced just sufficiently to pivotally receive therebetween link 70 of bucket control means 72, as shown in FIG. 1. Therefore, pin 69 passes through bracket 68, through link 70, and finally through the other bracket 68 to pivotally mount link 70. Pin 69 is held in place by cotter key 71, or other generally known suitable means, as described above. As will be discussed below, link 70 of bucket control means 72 acts upon pin 69 to cause bucket 63 to pivot about pins 60. Brace 67 is therefore ideally positioned on the lower side of flange 66 between brackets 68 to support flange 66 at an area of high stress, that is, the area where brackets 68 are mounted.

Figure 4:
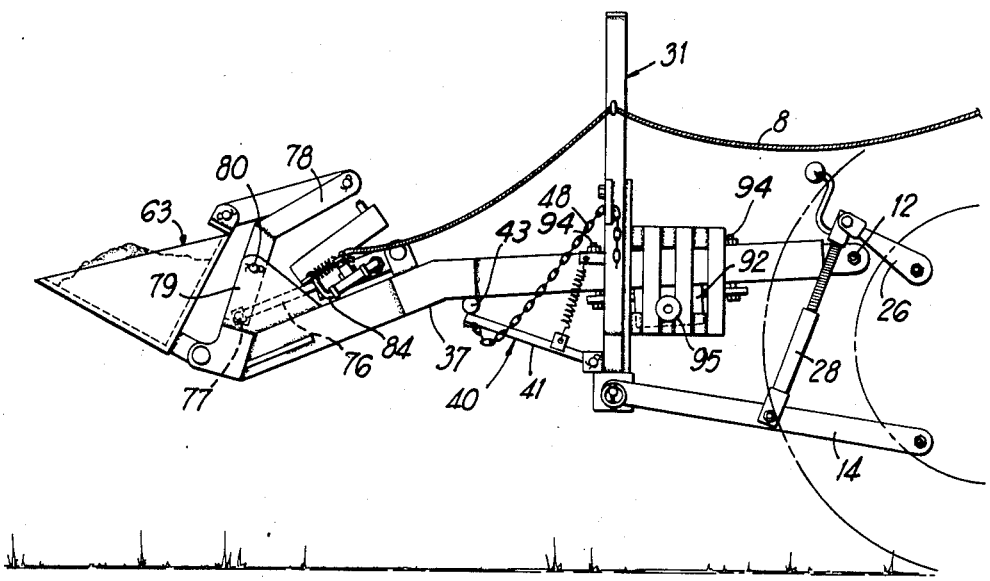
FIG. 4 is a side elevational view of the present invention in a raised position with the force raising the boom being applied at the sleeve.
Figure 5:
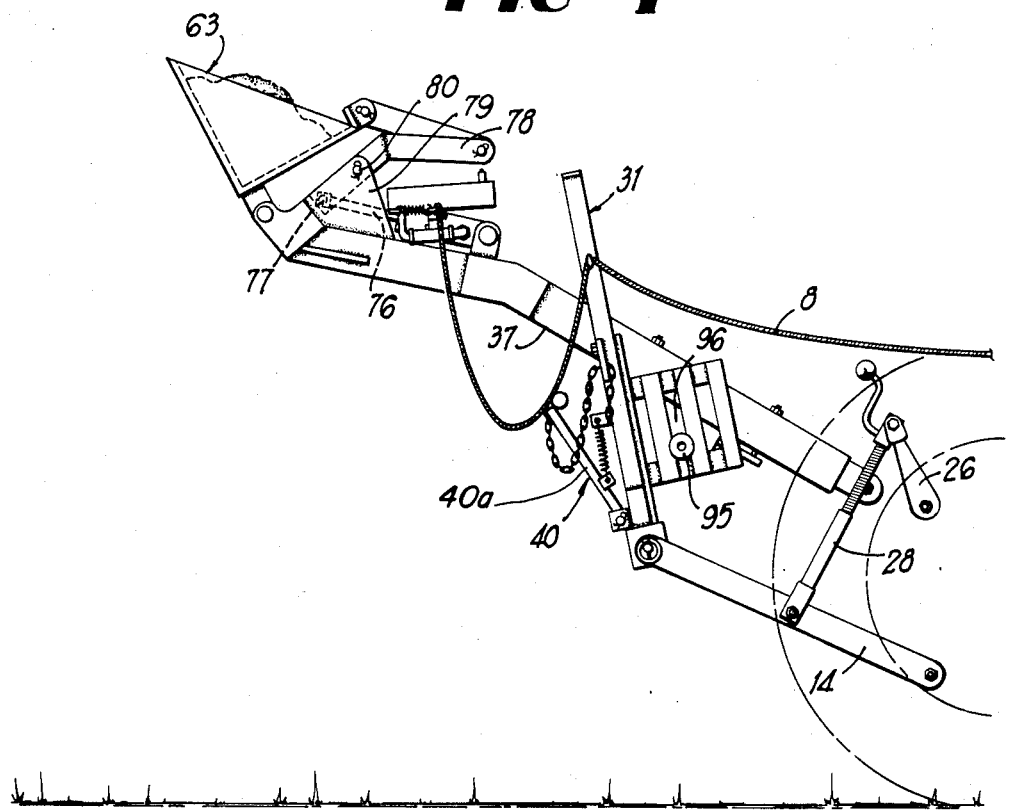
FIG. 5 is a side elevational view of the present invention in a raised position.
Figure 6:
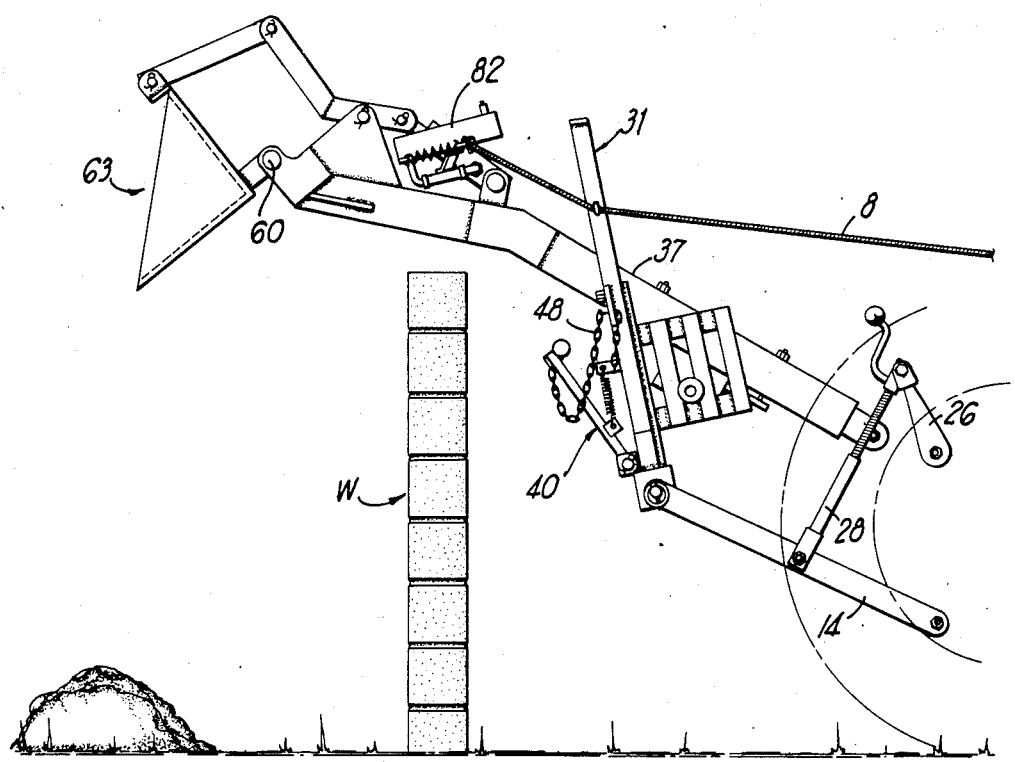
FIG. 6 is a side elevational view of the present invention in a raised position with the bucket in a dumped position.
Figure 6:
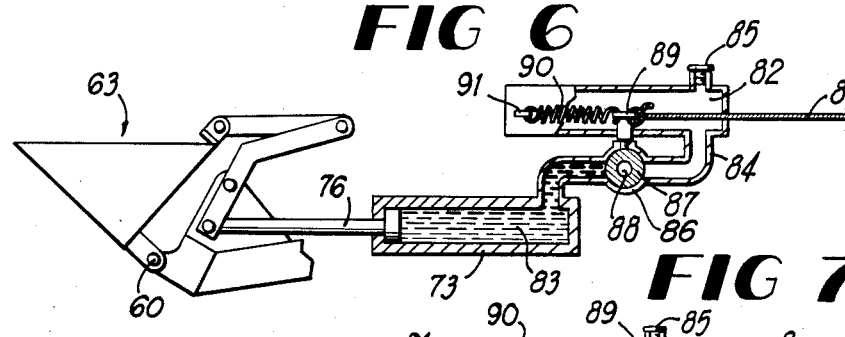

The pivotal movement of bucket 63 about pins 60 is controlled by bucket control means 72. Bucket control means 72 includes cylinder 73, pivotally mounted at one end to brackets 74 by pin 75. Piston 76 is received in cylinder 73 at its other end, thus comprising a piston and cylinder assembly as is generally known in the prior art. Pivotally attached at the forward end of piston 76, by pin 77, is a pair of spaced, control arms 78. Control arms 78 are bar members which are angled as shown in FIGS. 4 and 5, so that the top portion of each arm 78 bends slightly back toward cylinder 73. The lower part of each arm 78 is pivotally connected to brace 79 by pin 80 (FIGS. 1, 4, and 5). Control arms 78 are spaced sufficiently to allow their pivotal attachment at their lower ends to either side of piston 76. Preferably, the upper angled portions of arms 78 are braced by plate 81 so that arms 78 are unitarily coupled and pivot together about pin 80 in unison. Pivotally connected to the upper end of arms 78, by pin 82, is the rearward end of link 70. Therefore, as piston 76 retracts into cylinder 73, control arms 78 are caused to pivot in counterclockwise fashion about pin 80. This action forces link 70 downwardly. Since bucket 63 freely pivots about pins 60, bucket 63 is also caused to pivot in a conterclockwise manner and so be placed in a lowered or "dump" position. The general configuration of the elements of bucket control means 72 when the bucket is on a "dump" position is shown in FIG. 6.

Mounted above cylinder 73 is reservoir 82. This reservoir can be mounted by any suitable means such as brackets (not shown) or other well known types of mounts; however, for the purposes of this invention it is important that the reservoir 82 be mounted so that its forward end is always below its rearward end as shown in FIGS. 1 through 6. This insures that the fluid 83 pools in the forward, lower end of reservoir 82. Reservoir 82 is filled with fluid 83 by removing threaded plug 85. Hydraulic line 84 connects cylinder 73 near its rearward end and is also connected to the forward end of reservoir 82 on the bottom of reservoir 82, as shown in FIGS. 3, 4, and 5. Check valve 86 is aligned within line 84 to control the flow of fluid 83 through line 84. This valve 86 can be of any suitable variety widely known in the prior art. For the purposes of illustration, a valve 86 has been depicted which ulitizes ball 87 having passage 88 therethrough. Arm 89 controls ball 87 and thus also controls the orientation of passage 88 with respect to line 84. Spring 90 is attached to arm 89 at one end and to ear 91 at its other end to position arm 89 so that valve 86 is in a normally closed position. Rope 8 is also attached to arm 89 so that by pulling on rope 8, against the force of spring 90, valve 86 can be selectively opened partially or placed into a completely open position. When tension on rope 8 is released, spring 90 will move arm 89 and thereby close valve 86, stopping fluid flow between cylinder 73 and reservoir 82.

Figure 7:
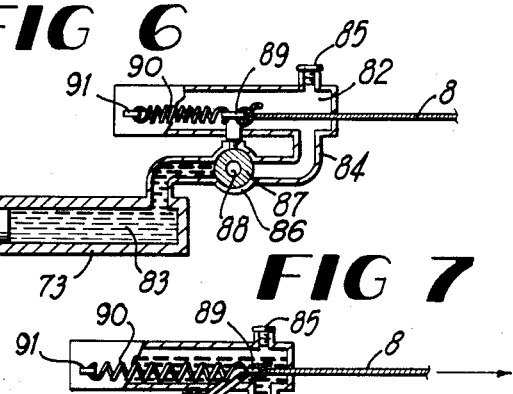
FIG. 7 is a schematic illustration of the bucket control means with the bucket of the present invention in a raised position.
Figure 8:
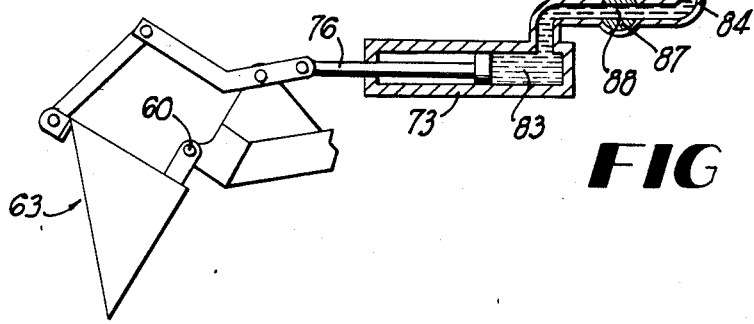
FIG. 8 is a schematic illustration of the bucket control means whith the bucket of the present invention in a dumped position.

Thus, the operation of the bucket control means 72 is as follows: referring to FIGS. 7 and 8, which depict bucket control means 72 in schematisized illustration, FIG. 7 shows bucket 63 in its operating position, that is, positioned so material may be placed and held within bucket 63. The weight of bucket 63, through linkage 70 and control arms 78, tends to force piston 76 into cylinder 73. However, since valve 86 is in its normally closed position (FIG. 7), fluid 83 is restricted in cylinder 73 and piston 76 is thereby held out of cylinder 73. This holds bucket 63 in its loading position. When it is desired to place bucket 63 into a "dump" position, the operator applies tension to rope 8 which will selectively open valve 86. As valve 86 is opened, the piston, which is under a force from the weight of the bucket 63 as applied through link 70 and arms 78, forces fluid 83 out of cylinder 73 and into reservoir 82. As stated, since valve 86 is spring loaded to a normally closed position, it may be selectively opened to allow fluid 83 to pass therethrough a little at a time. This will cause bucket 63 to be selectively placed into various dump positions. This cannot be effectively accomplished by the manual bucket control means in the prior art, in which the operation of the manual bucket control means serves to drop the contents of the bucket all at once. Further, the bucket control means 72 of the present invention is not pressurized by any outside hydraulic power source, such as that from a farm tractor or other vehicle. FIG. 8 depicts valve 86 in its open position, which permits fluid 83 to flow out of cylinder 73 and into reservoir 82 and thus allowing bucket 63 to be placed into its "dump" position. Since bucket 63 is freely pivoted at pins 60, as shown in the accompanying figures, the bucket 63 will tend to fall into a dumped position when the valve 86 is opened, even when bucket 63 is empty.

To place bucket 63 into its normal loading position (FIG. 7), from its "dump" position (FIG. 8), the operator opens valve 86 and drops boom 37 so that bucket 63 contacts the ground. The weight of boom 37 will cause bucket 63 to pivot clockwise on pins 60, thereby placing bucket 63 into its operating position. As bucket 63 rotates clockwise, the action of link 70 and control arms 78 will pull piston 76 out of cylinder 73. As shown in FIGS. 1–6, line 84 attaches to reservoir 82 at is forward end, which is lower than its rearward end. This insures that sufficient fluid is pooled at line 84 so that only fluid is pulled into cylinder 73. As piston 76 is so pulled out of cylinder 73, a vacuum tends to be created. Since valve 86 is open, fluid 83 will flow out of reservoir 82 and into cylinder 73. When bucket 63 is in its desired operating position, the operator releases tension on the rope 8, allowing spring 90 to close valve 86. When valve 86 is now closed, fluid is restricted in cylinder 73, which maintains piston 76 out of cylinder 73 and so keeps bucket 63 in its operating position.

Attention is now directed to opposite or rearward end of the present invention. As stated earlier, the present invention is designed so that it may be adjusted to be releasably attachable to different models of vehicles having a three-point hitch. As shown in FIG. 4, slidably attached to the lower portion of boom 37, near its rearward end, is adjusting sleeve 92, which is a hollow, square member made of square steel. Rectangular plate 93 passes longitudinally through sleeve 92 and is securely held to the bottom of boom 37 by pins 94, which pass through boom 37 and plate 93 on either side of sleeve 92. Thus, sleeve 92 may be selectively positioned along plate 93 between pins 94. Additionally, for ease of placement, sleeve 92 may be rigidly mounted at selective positions along plate 93 by including holes through the top side of sleeve 92 and anchoring sleeve 92 to plate 93 by pins (not shown) which are either securely attached to plate 93 or which pass through sleeve 92 and plate 93. However, such rigid mounting of sleeve 92 to plate 93 is not absolutely necessary for the operability of the invention. Pin 95 passes through a transverse apperture (not shown) in sleeve 92.

Figure 2:
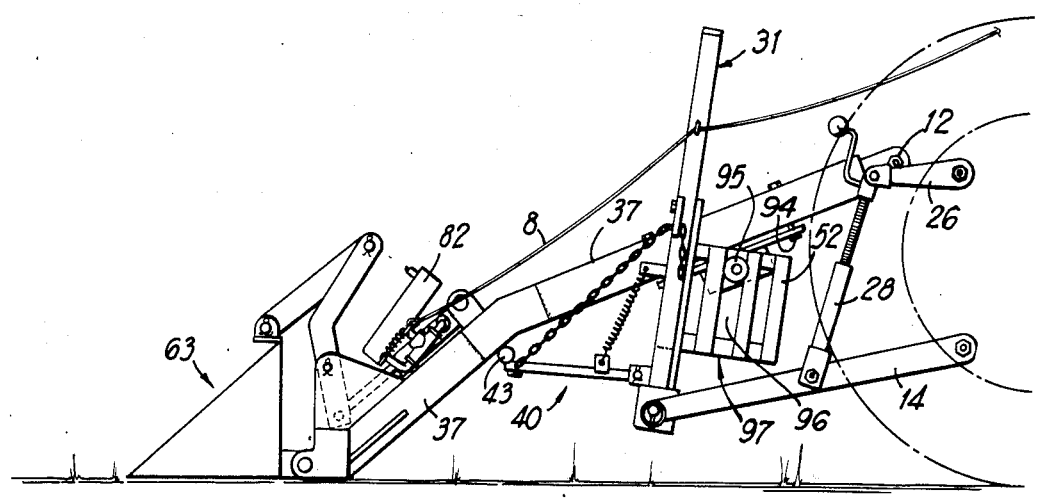
FIG. 2 is a side elevational view of the present invention in its lowered position.
Figure 3:
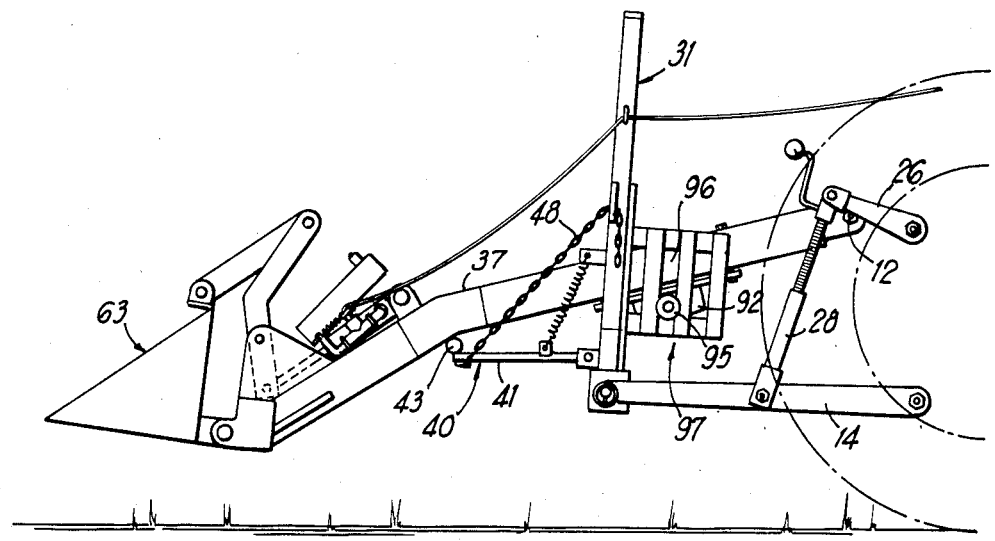
FIG. 3 is a side elevational view of the present invention in a raised position with the force raising boom being applied at the power bar.

Therefore, as shown in FIG. 2, boom 37 passes between standards 35 and 36 and frames 52 and is pivotally mounted to top bracket 12 on tractor housing 22. Lifting frame 31 is pivotally attached to lifting levers 14 and 16 as shown in FIG. 1. Sleeve 92 is selectively positioned longitudinally along plate 93 so that pin 95 may be placed therethrough and also through an appropriate space 96 between vertical bars 55. The appropriate space 96 will depend upon which model of vehicle the present invention is attached to. The combination of the adjusting sleeve 92, pin 95 and adjusting frames 52 allow the present invention to be mounted on and operated by various models of vehicles which have the three mounting points of their respective three-point hitches at various, relative positions. For some models of vehicles, it may even be necessary to mount plate 93 and sleeve 92 on the top of boom 37. This is readily accomplished, since plate 93 is releasably attachable to boom 37 by pins 94.

After the present invention has been adjustably mounted to a selected vehicle, it is operated as follows: FIG. 2 shows the present invention mounted to a vehicle and in a lowered position. In FIG. 2, pin 95 is positioned through spaces 96 in frames 52. Since boom 37 is in a lowered position, pin 95 is in the uppermost point of travel within spaces 96 of frames 52. As the lifting controls (not shown) of the vehicle are actuated, arms 24 and 26 are caused by the power means (not shown) of the vehicle to rotate. This lifts links 28 and 30 which in turn causes lifting arms 14 and 16 to rotate, thus raising lifting frame 31. Since power bar 40 is in contact with boom 37, the initial lifting force is applied to boom 37 at power bar 40. Because the lifting force is applied to the boom 37 closer to the load within bucket 63, a mechanical advantage is achieved over loading devices described in the prior art in which all lifting force is applied at lifting arm 14 and 16. Since a greater force must be applied to raise the boom 37 when bucket 63 is initially lifting a single load from, for example, a pile of gravel, when the load is below the attachment points 33 and 34 of the loading device to the vehicle, the power bar allows a greater load to be lifted initially than could be accomplished if the initial lifting force were applied at lifting arms 14 and 16.

As bucket 63 is raised from the ground, bar 43 of power bar 40 slides along the lower side of boom 37 towards angle 56. While the boom is being raised, pin 95 moves downwardly within spaces 96 in frames 52. FIG. 3 shows boom 37 raised to a height in which the lifting force is still being applied at bar 43, and pin 95 has reached the lowermost position of travel within space 96. As boom 37 is lifted beyond this height, the lifting force on boom 37 is transferred from bar 43 to sleeve 92 and pin 95. At this point, the load is now broken away from its pile on the ground and the load is at a height approximanting the height of attachment points 33 and 34, the mechanical advantage is not as necessary as during the initial lifting phase.

FIG. 4 shows boom 37 lifted at a sufficient height so that lifting force is transferred from bar 42 to sleeve 92 and pin 95. Chains 48 are no longer under tension and so become slack. Spring 97 now lifts power bar 40 out of an operative position so that power bar 40 is not projecting forward to contact, for example, a wall or side of a truck, as the loading device approaches it for dumping. FIGS. 5 and 6 show power bar 40 fully retracted by spring 97 into an inoperative position.

Also accomplished by the present invention, bucket 63 can be lifted higher than that of the prior art using a standard three-point hitch loader, because of the configuration of the adjusting means 97, including lifting frame 31, sleeve 92, pin 95, and boom 37.

FIG. 6 shows bucket 63 raised to an extended height and in a dumped position.

It will be obvious to those skilled in the art that many variations may be made in the embodiment chosen for the purpose of illustrating the present invention without departing from the scope thereof, as defined by the appended claims.

What is claimed is:

1. A loading device for attachment to a vehicle, comprising:
   a boom including loading means, said boom being pivotably secured at one end to a vehicle;
   a first lifting means for lifting said boom by pivoting said boom at said one end, said lifting means being engageable with said boom at a position between the location of said loading means and said pivotably secured one end; and
   a second lifting means for lifting said boom, said second lifting means being engageable with said boom between the location of said loading means and said position of engagement of said first lifting means;
   wherein said boom is liftable by engagement with said second lifting means to a first predetermined position and is liftable by engagement with said first lifting means to a second predetermined position higher than said first predetermined position.

2. A loading device as claimed in claim 1, wherein said loading device is releasably mounted to a three point hitch, wherein said first lifting means is pivotably mounted to first and second points of said three point hitch, and wherein said one end of said boom is pivotably secured to said vehicle by means of a third point of said three point hitch.

3. The loading device defined in claim 2, wherein said first lifting means includes adjusting means to facilitate the attachment to different models of vehicles having a three-point hitch.

4. The loading device defined in claim 1, wherein said second lifting means includes a bar disposed adjacent to said boom for slidably moving along said boom as said boom is raised.

5. A loading device as claimed in claim 1, wherein said first lifting means is disengaged from said boom when said boom is at a position lower than said first predetermined position.

6. The loading device defined in claim 5, wherein said second lifting means is provided with tension means to move said second lifting means out of a lifting position when said boom is raised sufficiently to allow said first lifting means to begin raising said boom.

7. The loading device defined in claim 1, wherein said second lifting means is selectively adjustable to be placed in different operating positions.

8. The loading device defined in claim 1, wherein the position of said loading means is controlled by non-pressurized hydraulic means.

9. The loading device defined in claim 8, wherein said non-pressurized hydraulic means includes the combination of a piston and cylinder assembly, a reservoir, a hydraulic line connecting said piston and cylinder assembly and said reservoir, and a valve which controls the flow of hydraulic fluid through said hydraulic line.

10. The loading device defined in claim 9, wherein said piston is in its retracted position out of said cylinder when said loading means is in a dump position.

11. The loading device defined in claim 1, wherein said second lifting means includes a bar for providing a mechanical advantage during the initial lifting of said loading means from a point below said second lifting means.

12. The loading device defined in claim 3, wherein said adjusting means includes a frame having a slot therein, a sleeve, and a pin whereby said sleeve is mounted onto said boom and has a hole therethrough to receive said pin, and said pin also passing through said slot to facilitate attachment of said loading device to various models of vehicles.

13. A loading device adapted to be releasably attached to a vehicle having means for providing power for the operation of said loading device and having a three-point hitch means, comprising:
   a first lifting means pivotally mounted to said three-point hitch means;
   a second lifting means positioned away from said vehicle with respect to said first lifting means and pivotally mounted to said first lifting means;
   a boom attached at one end to said three-point hitch means and engageable with said first and second lifting means wherein said boom is liftable by engagement with said second lifting means to a first predetermined position and is liftable by engagement with said first lifting means to a second predetermined position higher than said first predetermined position;
   a bucket pivotally attached to the other end of said boom; and
   means for controlling the pivotal movement of said bucket whereby said lifting means of said loader is powered by said power means of said vehicle.

14. The loading device defined in claim 13, wherein said means for controlling the pivotal movement of said bucket is comprised of a hydraulic piston and cylinder assembly.

15. The loading device defined in claim 13, wherein said loading device includes adjusting means for attaching said loading device to different models of farm vehicles.

16. The loading device defined in claim 14, wherein said means for controlling the pivotal movement of said bucket is comprised of a hydraulic piston and cylinder assembly, a check valve, a reservoir, an angled control arm attached at one end to a piston, and a linkage attached to the other end of said control arm, whereby said valve is operated to allow fluid to flow between said cylinder and said reservoir which permits said piston to move into or out of said cylinder which actuates said control arm and said linkage.

17. The loading device defined in claim 15, wherein said adjusting means includes a frame having a slot therein, a sleeve, and a pin whereby said sleeve is mounted onto said boom and has a hole therethrough to receive said pin, and said pin also passing through said slot to facilitate attachment of said loading device to various models of vehicles.

18. The loading device defined in claim 12, wherein said second lifting means includes a bar for providing a mechanical advantage during the initial lifting of said bucket from a point below said second lifting means.

19. A loading device adapted to be releasably attached to a vehicle having means for providing power for the operation of said loading device and having a three-point hitch means, comprising:
   a first lifting means pivotally mounted to said three-point hitch means;
   a second lifting means positioned away from said vehicle with respect to said first lifting means and pivotally mounted to said first lifting means;
   a boom attached at one end to said three-point hitch means and engageable with said first and second lifting means;
   a bucket pivotally attached to the other end of said boom; and
   means for controlling the pivotal movement of said bucket whereby said lifting means of said loader is powered by said power means of said vehicle;
   wherein said second lifting means includes a bar disposed adjacent to said boom for slidably moving along said boom as said boom is raised; and
   wherein said second lifting means is provided with tension means to move said second lifting means out of a lifting position when said boom is raised sufficiently to allow said first lifting means to begin raising said boom.

* * * * *